United States Patent
Tanaka et al.

(10) Patent No.: US 11,661,879 B2
(45) Date of Patent: May 30, 2023

(54) TUBULAR MEMBER FOR EXHAUST GAS TREATMENT DEVICE AND EXHAUST GAS TREATMENT DEVICE USING THE TUBULAR MEMBER, AND METHOD OF MANUFACTURING TUBULAR MEMBER FOR EXHAUST GAS TREATMENT DEVICE

(71) Applicant: NGK INSULATORS, LTD., Nagoya (JP)

(72) Inventors: Daichi Tanaka, Nagoya (JP); Yukinari Shibagaki, Obu (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/457,741

(22) Filed: Dec. 6, 2021

(65) Prior Publication Data

US 2022/0275746 A1    Sep. 1, 2022

(30) Foreign Application Priority Data

Feb. 26, 2021  (JP) .............................. JP2021-030169

(51) Int. Cl.
*F01N 3/20* (2006.01)
*F01N 3/28* (2006.01)
*B01D 53/94* (2006.01)

(52) U.S. Cl.
CPC ........... *F01N 3/2803* (2013.01); *B01D 53/94* (2013.01); *F01N 3/2026* (2013.01); *F01N 2370/02* (2013.01)

(58) Field of Classification Search
CPC ...... F01N 3/2026; F01N 3/2803; F01N 13/14; F01N 2510/02; C03C 10/0009; C03C 10/0045; C03C 10/0054; C03C 2201/10
USPC .......................................................... 422/179
See application file for complete search history.

(56) References Cited

U.S. PATENT DOCUMENTS

| | | | |
|---|---|---|---|
| 8,784,741 B2 | 7/2014 | Yoshioka et al. | |
| 2008/0175764 A1* | 7/2008 | Sako | F01N 3/2853 422/177 |
| 2013/0025267 A1 | 1/2013 | Yoshioka et al. | |
| 2016/0068428 A1* | 3/2016 | Li | C03C 3/095 501/38 |

FOREIGN PATENT DOCUMENTS

| | | | |
|---|---|---|---|
| EP | 2674401 A1 * | 12/2013 | ......... B01D 39/2017 |
| JP | 2012-154316 A | 8/2012 | |
| JP | 5408341 B2 | 2/2014 | |

* cited by examiner

*Primary Examiner* — Tom P Duong
(74) *Attorney, Agent, or Firm* — Burr Patent Law, PLLC

(57) ABSTRACT

A tubular member for an exhaust gas treatment device according to at least one embodiment of the present invention includes: a tubular main body made of a metal; and an insulating layer formed at least on an inner peripheral surface of the tubular main body. The insulating layer contains glass, the glass contains barium, and the glass has a content of barium of 5 mol % or more.

17 Claims, 3 Drawing Sheets

TUBULAR MEMBER FOR EXHAUST GAS TREATMENT DEVICE AND EXHAUST GAS TREATMENT DEVICE USING THE TUBULAR MEMBER, AND METHOD OF MANUFACTURING TUBULAR MEMBER FOR EXHAUST GAS TREATMENT DEVICE

BACKGROUND OF THE INVENTION

This application claims priority under 35 U.S.C. Section 119 to Japanese Patent Application No. 2021-030169 filed on Feb. 26, 2021 which is herein incorporated by reference.

1. Field of the Invention

The present invention relates to a tubular member for an exhaust gas treatment device and an exhaust gas treatment device using the tubular member, and a method of manufacturing a tubular member for an exhaust gas treatment device.

2. Description of the Related Art

In recent years, there has been proposed an electric heating catalyst (EHC) in order to relieve a decrease in exhaust gas purification performance immediately after starting an engine. The EHC has a configuration in which electrodes are arranged on a honeycomb structure formed of conductive ceramics, and the honeycomb structure itself is caused to generate heat by energization, to thereby increase the temperature of a catalyst supported by the honeycomb structure to an activating temperature before starting an engine or at the time of starting the engine.

The EHC is typically accommodated in a tubular member (sometimes referred to as "can") made of a metal to form an exhaust gas treatment device. The EHC improve exhaust gas purification efficiency at the time of starting a vehicle by energization as described above, but electric leakage from the EHC to an exhaust pipe may occur to decrease the purification performance. In order to solve such problem, there has been known a technology for preventing electric leakage by forming an insulating layer (typically containing a glass component) on an inner peripheral surface of the can (Japanese Patent No. 5408341 and Japanese Patent Application Laid-open No. 2012-154316).

SUMMARY OF THE INVENTION

According to the technologies described in Japanese Patent No. 5408341 and Japanese Patent Application Laid-open No. 2012-154316, the insulating layer may be peeled from the inner peripheral surface of the can. A primary object of the present invention is to provide a tubular member for an exhaust gas treatment device having excellent adhesiveness between a tubular main body and an insulating layer. A further object of the present invention is to provide an exhaust gas treatment device using such tubular member and a method of manufacturing such tubular member.

According to at least one embodiment of the present invention, there is provided a tubular member for an exhaust gas treatment device, including: a tubular main body made of a metal; and an insulating layer formed at least on an inner peripheral surface of the tubular main body. In at least one embodiment, the insulating layer contains glass, and the insulating layer satisfies at least one of the following items (1) and (2) after the following peeling test:

(1) an element derived from the insulating layer is present on the inner peripheral surface of the tubular main body; and (2) an element derived from the tubular main body is present in the insulating layer, where the peeling test involves repeating, until the insulating layer is peeled, an operation of placing the tubular member for an exhaust gas treatment device alternately in an environment of 900° C. and an environment of 150° C. in accordance with JIS H 8451:2008.

In at least one embodiment, the insulating layer contains glass, the glass contains barium, and the glass has a content of barium of 5 mol % or more.

In at least one embodiment, the glass further contains one of lanthanum, zinc, and a combination thereof. In at least one embodiment, the glass has a content of lanthanum of 2 mol % or more. In at least one embodiment, the glass has a content of zinc of 3 mol % or more.

In at least one embodiment, the insulating layer has a thickness of from 30 µm to 800 µm.

In at least one embodiment, the glass is glass containing a crystalline substance, and the glass contains silicon, boron, and magnesium.

According to another aspect of the present invention, there is provided an exhaust gas treatment device. The exhaust gas treatment device includes: an electric heating catalyst support capable of heating an exhaust gas; and the above-mentioned tubular member for an exhaust gas treatment device configured to accommodate the electric heating catalyst support.

According to still another aspect of the present invention, there is provided a method of manufacturing a tubular member for an exhaust gas treatment device including a tubular main body made of a metal and an insulating layer formed at least on an inner peripheral surface of the tubular main body. The method includes: preparing a tubular main body; and forming an insulating layer containing glass on an inner peripheral surface of the tubular main body. The glass in the insulating layer contains barium, and the glass has a content of barium of 5 mol % or more.

DESCRIPTION OF THE EMBODIMENTS

Embodiments of the present invention are described below with reference to the drawings. However, the present invention is not limited to these embodiments.

A. Tubular Member for Exhaust Gas Treatment Device

A-1. Overall Configuration of Tubular Member for Exhaust Gas Treatment Device

Figure 1:
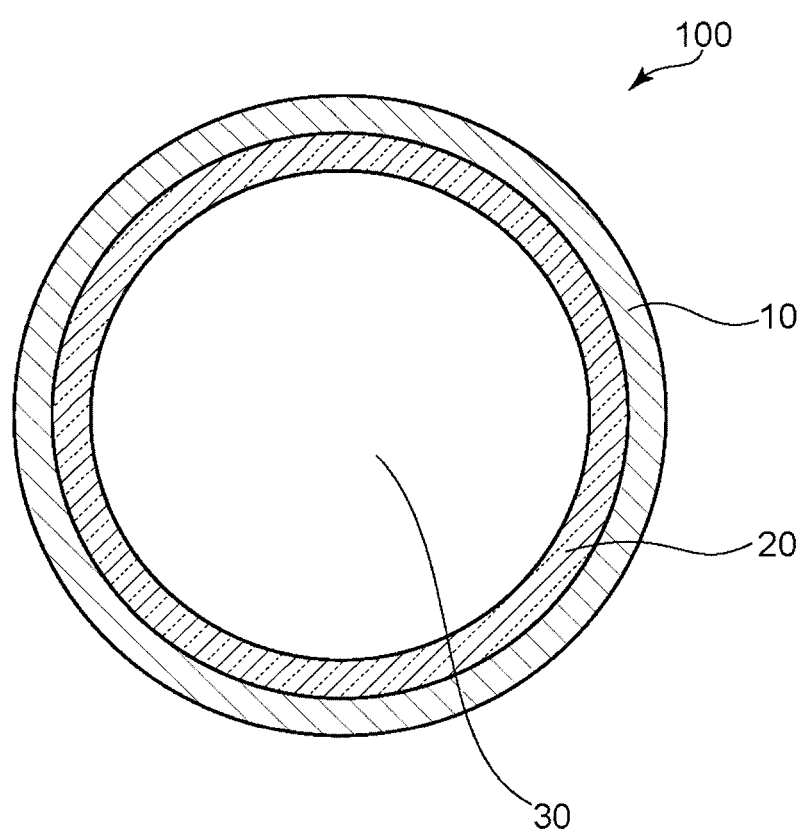
FIG. 1 is a schematic sectional view of a tubular member for an exhaust gas treatment device according to at least one embodiment of the present invention in a direction orthogonal to a flow path direction of an exhaust gas.

FIG. 1 is a schematic sectional view of a tubular member for an exhaust gas treatment device according to at least one embodiment of the present invention (hereinafter sometimes simply referred to as "tubular member") in a direction orthogonal to a flow path direction of an exhaust gas. A tubular member 100 of the illustrated example includes a tubular main body 10 and an insulating layer 20 formed at least on an inner peripheral surface of the tubular main body 10. The insulating layer may be formed only on the inner peripheral surface of the tubular main body as in the illustrated example, or may be formed on both the inner peripheral surface and an outer peripheral surface of the tubular main body although not shown. When the insulating layer is formed on both the inner peripheral surface and the outer peripheral surface of the tubular main body, the risk of electric leakage caused by unburnt deposits that may be accumulated in the vicinity of an end portion on an upstream side of an electric heating catalyst support can be suppressed.

In at least one embodiment of the present invention, the insulating layer 20 contains glass and satisfies the following item (1) and/or (2) after a predetermined peeling test:

(1) an element derived from the insulating layer is present on the inner peripheral surface of the tubular main body; and/or (2) an element derived from the tubular main body is present in the insulating layer, where the peeling test involves repeating, until the insulating layer is peeled, an operation of placing a tubular member for an exhaust gas treatment device alternately in an environment of 900° C. and an environment of 150° C. in accordance with JIS H 8451:2008. With such configuration, excellent adhesiveness between the tubular main body and the insulating layer can be achieved. From the above-mentioned item (1) or (2), it is inferred that an intermediate layer is formed at an interface between the tubular main body 10 and the insulating layer 20. The intermediate layer may be typically a compatible layer in which the constituent component of the tubular main body and the constituent component of the insulating layer are mixed. The intermediate layer may be formed, for example, when the constituent component of the tubular main body migrates to the insulating layer and the constituent component of the insulating layer migrates to the tubular main body. In some cases, the intermediate layer may contain a chemical reaction product of the constituent component of the tubular main body and the constituent component of the insulating layer. The intermediate layer may have a concentration gradient in which the constituent component of the tubular main body is decreased from a tubular main body side toward an insulating layer side, and/or the constituent component of the insulating layer is decreased from the insulating layer side toward the tubular main body side. When such intermediate layer is formed, the interface between the tubular main body and the insulating layer becomes unclear, and it is inferred that the adhesiveness is improved. However, such inference does not constrain any embodiment of the invention of the present application and the mechanism thereof.

The tubular member 100 has a cavity (hollow portion) 30 defined in a center portion in a cross-section in a direction orthogonal to the flow path direction of the exhaust gas. The electric heating catalyst support is accommodated in the cavity 30 to form an exhaust gas treatment device. The tubular member 100 of the illustrated example has a cylindrical shape (the sectional shape in the direction orthogonal to the flow path direction of the exhaust gas is circular), but the shape of the tubular member may be appropriately designed in accordance with purposes. For example, the tubular member 100 may have a tubular shape in which the cross-section has a polygonal shape (e.g., a quadrangular shape, a hexagonal shape, or an octagonal shape) or an elliptical shape. The tubular main body and the insulating layer are specifically described below. Details of the electric heating catalyst support and the exhaust gas treatment device are described later in the section B.

A-2. Tubular Main Body

The tubular main body 10 is typically made of a metal. With such configuration, production efficiency is excellent, and the electric heating catalyst support can be easily accommodated or attached. As a material for forming the tubular main body, there are given, for example, stainless steel, a titanium alloy, a copper alloy, an aluminum alloy, and brass. Of those, stainless steel is preferred because of high durability and reliability, and low cost.

In at least one embodiment, the tubular main body contains chromium. Chromium may be typically introduced in order to impart corrosion resistance to the tubular main body (e.g., stainless steel). The content of chromium in the tubular main body may be, for example, 10.5 mass % or more, and may be, for example, from 12 mass % to 20 mass %. Even when the tubular main body contains chromium, the generation of an environmentally hazardous substance under high temperature can be suppressed satisfactorily by optimizing the glass composition of the insulating layer described later, specifically by setting the content of an alkali metal element in the glass to 1,000 ppm or less.

The thickness of the tubular main body may be, for example, from 0.1 mm to 10 mm, may be, for example, from 0.3 mm to 5 mm, and may be, for example, from 0.5 mm to 3 mm. When the thickness of the tubular main body falls within such ranges, the tubular main body may be excellent in durability and reliability.

The length of the tubular main body may be appropriately set in accordance with purposes, the length of the electric heating catalyst support, and the like. The length of the tubular main body may be, for example, from 30 mm to 600 mm, may be, for example, from 40 mm to 500 mm, and may be, for example, from 50 mm to 400 mm. The length of the tubular main body is preferably larger than the length of the electric heating catalyst support. In this case, the electric heating catalyst support may be arranged so that the electric heating catalyst support is not exposed from the tubular main body.

The inner peripheral surface of the tubular main body may be subjected to surface treatment as required. A typical example of the surface treatment is roughening treatment, such as blasting. Through the roughening treatment, adhesiveness between the insulating layer to be obtained and the tubular main body can be improved.

The tubular main body may have a double structure including an outer tubular portion and an inner tubular portion arranged coaxially (not shown). In this case, the insulating layer may be formed between the outer tubular portion and the inner tubular portion (on an inner peripheral surface of the outer tubular portion or on an outer peripheral surface of the inner tubular portion), on an inner peripheral surface of the inner tubular portion, or both.

A-3. Insulating Layer

The insulating layer 20 imparts an electrical insulating property between the tubular member 100 and the electric heating catalyst support (described later). Herein, from the viewpoint of suppressing electric leakage to a surrounding exhaust pipe, the electrical insulating property typically satisfies JIS standard D5305-3 and an insulation resistance value per unit voltage is, for example, 100 Ω/V or more. The insulating layer 20 preferably further has moisture impermeability and moisture non-absorbability. That is, the insulating layer 20 may be configured to be so dense as to prevent the permeation and absorption of water. Regarding denseness, the insulating layer may have a porosity of, for example, 10% or less, and for example, 8% or less.

In at least one embodiment of the present invention, the insulating layer 20 contains glass. The glass typically contains barium. Barium may be contained in the glass, for example, in the form of BaO. The content of barium is typically 5 mol % or more, preferably from 6 mol % to 20 mol %, more preferably from 6 mol % to 18 mol %. When the glass contains barium, an insulating layer significantly having excellent adhesiveness to the tubular main body can be formed. More specifically, the insulating layer may be broken, for example, when heating and cooling of the tubular main body are repeated. It is inferred that the foregoing occurs because a large stress is generated at an interface between the insulating layer (glass) and the tubular main body (metal) after the repetition of heating and cooling due to a large difference in thermal expansion coefficient, Young's modulus, or the like between the insulating layer and the tubular main body. When the glass contains barium, the difference in thermal expansion coefficient and/or Young's modulus between the glass (insulating layer) and the tubular main body is decreased to reduce the generation of a stress, and the breakage of the insulating layer can be suppressed, for example, even after the repetition of heating and cooling. Barium (substantially, BaO) is also a constituent component of a crystalline substance (crystal) described later. As used herein, the "content of an element in the glass" is a molar ratio of an atom of the element when the amount of all the atoms in the glass excluding an oxygen atom is set to 100 mol %. The amount of an atom of each element in the glass may be measured, for example, by inductively coupled plasma (ICP) emission spectrometry.

The glass may further contain lanthanum, zinc, or a combination thereof. Lanthanum may be contained in the glass, for example, in the form of $La_2O_3$. Zinc may be contained in the glass, for example, in the form of ZnO. Lanthanum (substantially, $La_2O_3$) is a component for improving flowability. Zinc (substantially, ZnO) is a constituent component of a crystalline substance (crystal) described later. When the glass contains lanthanum, zinc, or a combination thereof, the adhesiveness to the tubular main body can be further improved. The content of lanthanum is preferably 2 mol % or more, more preferably from 2 mol % to 17 mol %. The content of zinc is preferably 3 mol % or more, more preferably from 3 mol % to 8 mol %. The total content of lanthanum and zinc may be, for example, from 4 mol % to 20 mol %, and may be, for example, from 8 mol % to 20 mol %.

In at least one embodiment, the glass may be glass containing a crystalline substance. When the glass contains a crystalline substance, an insulating layer that is difficult to soften and deform even under high temperature (e.g., 750° C. or more) can be formed. The insulating layer can maintain a pressure of 0.1 MPa, which is understood to be required for holding an electric heating catalyst support when the electric heating catalyst support is accommodated, for example, under an environment of 750° C. or more. Accordingly, in the exhaust gas treatment device, the displacement of the electric heating catalyst support, the movement thereof to an undesired position, and the like can be suppressed. As a result, a tubular member for an exhaust gas treatment device that can stably maintain an exhaust gas treatment (typically, purification) function even under high temperature can be achieved. Further, when the glass contains a crystalline substance, an insulating layer having excellent adhesiveness to the tubular main body can be formed. This is because a difference in thermal expansion coefficient from the metal (tubular main body) can be reduced, and a thermal stress generated during heating can be reduced. The presence or absence of a crystalline substance (crystal) may be recognized by an X-ray diffraction method.

The glass (typically, the glass containing a crystalline substance) typically contains silicon, boron, and magnesium. With such configuration, flowability at the time of insulating layer formation is excellent, and a predetermined crystal can be formed. Accordingly, a uniform insulating layer can be formed, and an insulating layer that is difficult to soften and deform even under high temperature (e.g., 750° C. or more) can be formed. Silicon may be contained in the glass, for example, in the form of $SiO_2$. Boron may be contained in the glass, for example, in the form of $B_2O_3$. Magnesium may be contained in the glass, for example, in the form of MgO. In other words, such glass may be, for example, $SiO_2$—$B_2O_3$—MgO-based glass.

Silicon (substantially, $SiO_2$) is a component for forming the skeleton of the glass. More specifically, silicon is a component for precipitating a crystal by heat treatment, and is also a component for widening a vitrification range to facilitate vitrification and improving water resistance and heat resistance. The content of silicon in the glass is preferably from 5 mol % to 50 mol %, more preferably from 5 mol % to 40 mol %, still more preferably from 8 mol % to 35 mol %. Boron (substantially, $B_2O_3$) is a component for enhancing devitrification resistance as well as meltability and flowability. The content of boron is preferably from 5 mol % to 60 mol %, more preferably from 20 mol % to 60 mol %, still more preferably from 25 mol % to 55 mol %. Magnesium (substantially, MgO) is a constituent component of a crystal, and is also a component for lowering high-temperature viscosity to enhance meltability and flowability. When the glass contains magnesium, an insulating layer which is difficult to soften and deform even under high temperature and which is uniform can be formed. The content of magnesium in the glass is preferably from 20 mol % to 40 mol %, more preferably from 25 mol % to 35 mol %. When the contents of silicon, boron, and magnesium fall within such ranges, the above-mentioned effect (formation of an insulating layer which is uniform and which is difficult to soften and deform even under high temperature) becomes more remarkable.

The glass may further contain other metal elements. Examples of such metal elements include aluminum, calcium, and strontium. Those metal elements may be contained in the glass alone or in combination thereof. The other metal elements may also be contained in the glass in the form of metal oxides (e.g., $Al_2O_3$, CaO, and SrO) as with the above-mentioned elements. The contents of those metal elements in the glass may be defined as the balance obtained by excluding the above-mentioned elements and inevitable impurities. Aluminum (substantially, $Al_2O_3$) is a component for forming the skeleton of the glass, increasing the strain point thereof, adjusting the viscosity thereof, and suppressing the phase separation thereof. Calcium (substantially, CaO) is a component for widening a vitrification range to facilitate vitrification, and is also a component for lowering high-temperature viscosity to enhance meltability and flowability without decreasing the strain point. Strontium (substantially, SrO) is a component for widening the vitrification range to facilitate vitrification, and is also a component for suppressing the phase separation and enhancing devitrification resistance. The content of aluminum may be, for example, from 5 mol % to 20 mol %, and may be, for example, from 5 mol % to 15 mol %. In addition, the content of calcium may be, for example, from 3 mol % to 7 mol %. The content of strontium may be, for example, from 8 mol % to 12 mol %.

In at least one embodiment, the content of an alkali metal element in the glass may be, for example, 1,000 ppm or less. That is, the glass may be so-called alkali-free glass. The content of the alkali metal element is preferably 800 ppm or less, more preferably 500 ppm or less, still more preferably 200 ppm or less, particularly preferably 100 ppm or less. It is preferred that the content of the alkali metal element be smaller, and the content may be, for example, substantially zero (less than a detection limit). When the content of the alkali metal element in the glass is extremely small, a tubular member for an exhaust gas treatment device capable of suppressing the generation of an environmentally hazardous substance even under high temperature can be achieved. As used herein, the "content of an alkali metal element in the glass" means the total amount of alkali metal elements contained in the glass. Examples of the alkali metal include lithium, sodium, potassium, rubidium, cesium, and francium. The alkali metal element in the glass may be, for example: sodium, potassium, or a combination thereof; or sodium. The content of the alkali metal element may be measured, for example, by inductively coupled plasma (ICP) emission spectroscopy.

Typical configurations of the glass that may be used in at least one embodiment of the present invention are as shown in Table 1 below. In the glass, each element is contained in a range shown in Table 1, and the total of elements (excluding an oxygen atom) is 100. In Table 1, the content of each element is represented by "mol %". The configurations are each substantially free of an alkali metal element.

TABLE 1

|  | Configuration A | Configuration B | Configuration C |
|---|---|---|---|
| Silicon | 5 to 10 | 10 to 15 | 25 to 35 |
| Boron | 27 to 33 | 30 to 40 | 40 to 55 |
| Magnesium | 24 to 34 | 25 to 30 | — |
| Barium | 5 to 10 | 15 to 20 | 5 to 20 |
| Lanthanum | 2 to 17 | — | — |
| Zinc | 3 to 8 | 3 to 6 | — |
| Aluminum | 5 to 10 | 5 to 10 | 10 to 15 |

The thickness of the insulating layer is preferably from 30 µm to 800 µm, more preferably from 50 µm to 600 µm, still more preferably from 100 µm to 550 µm. When the thickness of the insulating layer falls within such ranges, both an excellent electrical insulating property and excellent adhesiveness to the tubular main body can be achieved.

The pressing deformation temperature of the insulating layer is preferably 600° C. or more, more preferably 750° C. or more, still more preferably 800° C. or more, particularly preferably 850° C. or more. The upper limit of the pressing deformation temperature may be, for example, 1,200° C. When the pressing deformation temperature of the insulating layer falls within such ranges, an insulating layer that is difficult to soften even under high temperature (e.g., 750° C. or more) can be formed. The pressing deformation temperature is a temperature at which the insulating layer is deformed by 10% with respect to the thickness of the insulating layer in the thickness direction of the insulating layer when the insulating layer is heated at a temperature increase rate of 10° C./min from normal temperature (25° C.) while being pressed at a pressure of 0.1 MPa through use of an alumina needle of 1 mmΦ.

The insulating layer may be formed as part (constituent element) of the tubular member for an exhaust gas treatment device as described above, or may be provided in a form capable of being distributed as an insulating layer. When the insulating layer is formed as part of the tubular member for an exhaust gas treatment device, the insulating layer may be typically formed by applying a material for forming the insulating layer to the tubular main body and drying and firing the material. A method of forming the insulating layer is described later in the section A-4. Examples of the form capable of being distributed as an insulating layer include a laminate in which an insulating layer is formed on any appropriate base material, a glass sheet of an insulating layer, and a glass roll of an insulating layer. Any of those may be attached to the tubular main body by any appropriate method. Specific examples of the attachment include bonding via an adhesive or the like and mechanical fixing.

A-4. Method of Forming Insulating Layer

The insulating layer may be formed by any appropriate method. The insulating layer is typically formed by applying and drying a slurry (dispersion) containing a glass source to form a coating film, and firing the coating film. The slurry may contain a raw material or a glass frit as the glass source. Now, as a typical example, a method of forming an insulating layer through use of a slurry containing a glass frit as the glass source is described.

The forming method according to at least one embodiment typically includes: producing a glass frit from a glass source (raw material); preparing a slurry containing the glass frit; forming a coating film of the slurry; and firing the coating film to form an insulating layer containing glass.

Specific examples of the raw material include silica sand (silicon source), dolomite (magnesium and calcium source), alumina (aluminum source), barium oxide, lanthanum oxide, zinc oxide (zinc flower), and strontium oxide. The raw material is not limited to an oxide, and may also be, for example, a carbonate or a hydroxide. The glass frit is typically produced by synthesizing glass from a raw material for glass and pulverizing the obtained glass (e.g., pulverizing the obtained glass in two stages of coarse pulverization and fine pulverization). When the glass is synthesized, melting under high temperature (typically, 1,200° C. or more) for a long period of time is performed.

The slurry (dispersion) is prepared by mixing the above-mentioned glass frit and a solvent. The solvent may be water or an organic solvent. The solvent is preferably water or a water-soluble organic solvent, and is more preferably water. The solvent may be mixed at a ratio of preferably from 50 parts by mass to 300 parts by mass, more preferably 80 parts by mass to 200 parts by mass with respect to 100 parts by mass of the glass frit. When the slurry is prepared, a slurry aid (e.g., a resin, a plasticizer, a dispersant, a thickener, or various additives) may be further mixed. The kind, number, combination, blending amount, and the like of the slurry aid may be appropriately set depending on purposes. As used herein, the "solvent" refers to a liquid medium contained in the slurry, and has a concept encompassing a solvent and a dispersion medium.

Next, the slurry is applied and dried to form a coating film. The coating film may be formed on the inner peripheral surface of the tubular main body or may be formed on any appropriate base material. As an application method, any appropriate method may be used. Specific examples of the application method include spraying, dipping under the condition of masking portions other than a portion of the tubular main body or the base material in which the insulating layer is to be formed, and bar coating. An application thickness may be adjusted in accordance with the above-mentioned desired thickness of the insulating layer. A drying temperature is, for example, from 40° C. to 120° C., and is, for example, from 50° C. to 110° C. A drying time is, for example, from 1 minute to 60 minutes, and is, for example, from 10 minutes to 30 minutes.

Finally, the coating film is fired to form an insulating layer. A firing temperature is preferably 1,100° C. or less, more preferably from 600° C. to 1,100° C., still more preferably from 700° C. to 1,050° C. A firing time is, for example, from 5 minutes to 30 minutes, and is, for example, from 8 minutes to 15 minutes.

As described above, the insulating layer may be formed. When the insulating layer is to be formed on both the inner peripheral surface and the outer peripheral surface of the tubular main body, the insulating layer may be formed also on the outer peripheral surface in the same manner as described above.

B. Exhaust Gas Treatment Device

Figure 2:
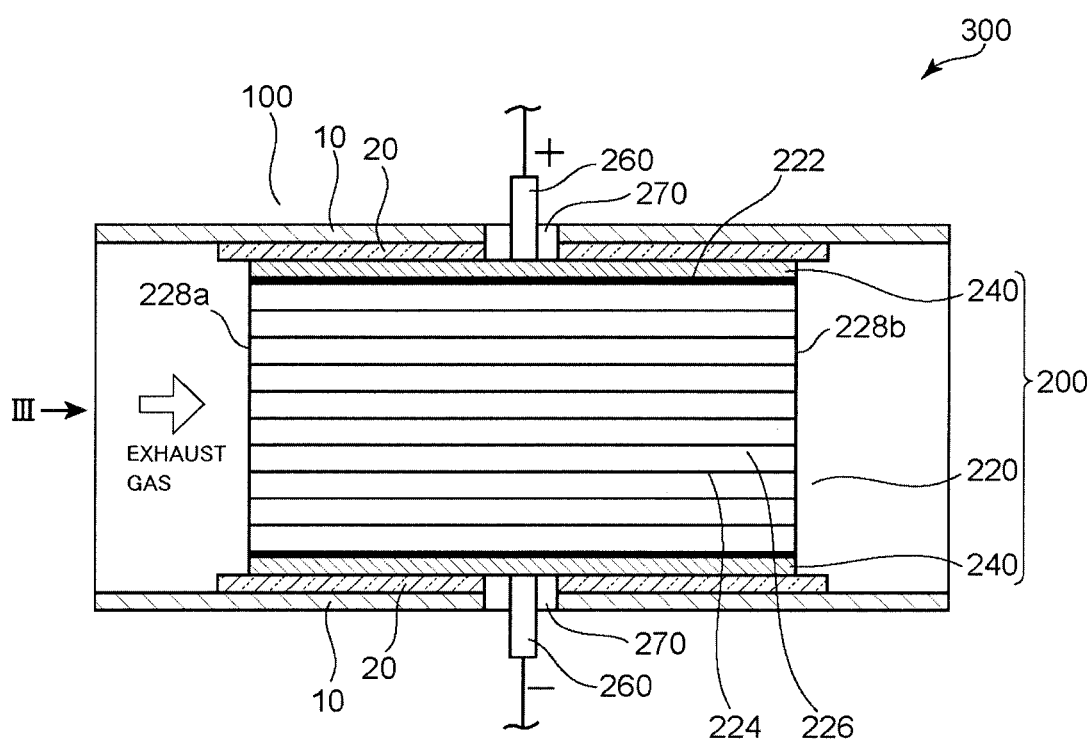
FIG. 2 is a schematic sectional view of an exhaust gas treatment device according to at least one embodiment of the present invention in a direction parallel to the flow path direction of the exhaust gas.
Figure 3:
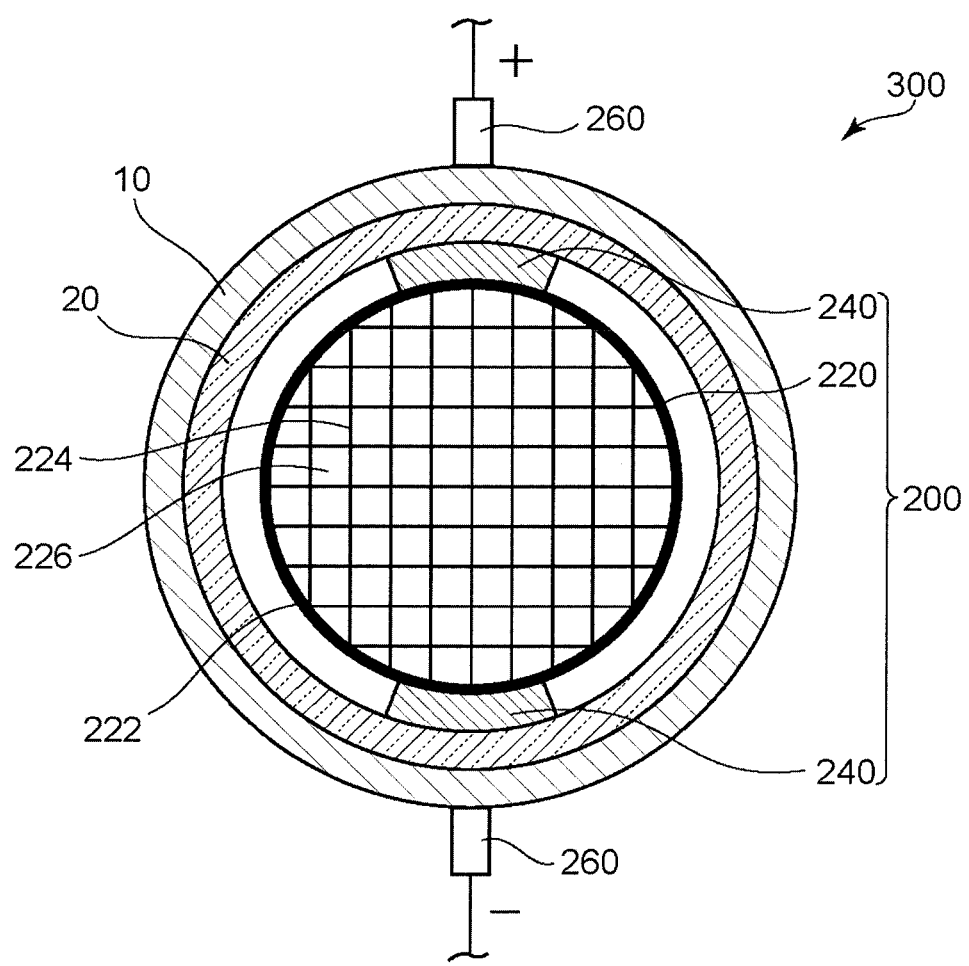
FIG. 3 is a schematic sectional view (schematic sectional view when viewed from a direction of the arrow III of FIG. 2) of the exhaust gas treatment device of FIG. 2 in a direction orthogonal to the flow path direction of the exhaust gas.

FIG. 2 is a schematic sectional view of an exhaust gas treatment device according to at least one embodiment of the present invention in a direction parallel to the flow path direction of the exhaust gas. FIG. 3 is a schematic sectional view of the exhaust gas treatment device of FIG. 2 when viewed from a direction of the arrow III. An exhaust gas treatment device 300 of the illustrated example includes an electric heating catalyst support (hereinafter sometimes simply referred to as "catalyst support") 200 capable of heating the exhaust gas and the tubular member 100 for accommodating the catalyst support 200. The tubular member 100 is the tubular member for an exhaust gas treatment device according to at least one embodiment of the present invention described in the section A and FIG. 1. The exhaust gas treatment device is installed in the middle of an exhaust gas flow path for allowing the exhaust gas to flow from an engine. When the catalyst support heated to the activating temperature of a catalyst and the exhaust gas are brought into contact with each other, CO, NO$_x$, a hydrocarbon, and the like in the exhaust gas passing through the catalyst support can be formed into harmless substances by a catalytic reaction.

The catalyst support 200 may have a shape corresponding to the shape of the tubular member 100. For example, when the tubular member 100 has a cylindrical shape, the catalyst support 200 may have a columnar shape. The catalyst support 200 is typically accommodated coaxially in the cavity 30 of the tubular member 100. The catalyst support may be accommodated directly in the tubular member (that is, without other members), or may be accommodated, for example, through intermediation of a holding mat (not shown). When the catalyst support is accommodated directly in the tubular member, the catalyst support may be fitted, for example, to the tubular member. The holding mat is typically an insulating material (e.g., alumina fibers) formed into a mat shape. The holding mat typically covers the outer peripheral surface of the catalyst support over the entire circumference, and the tubular member can hold the catalyst support through intermediation of the holding mat.

The catalyst support 200 includes a honeycomb structure portion 220 and a pair of electrode portions 240 arranged on a side of the honeycomb structure portion 220 (typically so as to be opposed to each other across a central axis of the honeycomb structure portion 220). The honeycomb structure portion 220 includes an outer peripheral wall 222 and partition walls 224 which are arranged on an inner side of the outer peripheral wall 222 and which define a plurality of cells 226 extending from a first end surface 228a to a second end surface 228b to form the exhaust gas flow path. The outer peripheral wall 222 and the partition walls 224 are typically formed of conductive ceramics. The pair of electrode portions 240 and 240 are provided with metal terminals 260 and 260, respectively. One metal terminal is connected to a positive electrode of a power supply (e.g., a battery), and the other metal terminal is connected to a negative electrode of the power supply (e.g., a battery). On the periphery of the metal terminals 260 and 260, covers 270 and 270 each made of an insulating material are arranged so as to insulate the tubular main body 10 and the insulating layer 20 from the metal terminals.

The catalyst is typically supported by the partition walls 224. When the catalyst is supported by the partition walls 224, CO, NO$_x$, a hydrocarbon, and the like in the exhaust gas passing through the cells 226 can be formed into harmless substances by the catalytic reaction. The catalyst may preferably contain a noble metal (e.g., platinum, rhodium, palladium, ruthenium, indium, silver, or gold), aluminum, nickel, zirconium, titanium, cerium, cobalt, manganese, zinc, copper, tin, iron, niobium, magnesium, lanthanum, samarium, bismuth, barium, and a combination thereof. The supported amount of the catalyst may be, for example, from 0.1 g/L to 400 g/L.

When a voltage is applied to the honeycomb structure portion 220, the honeycomb structure portion 220 can be energized to generate heat with Joule heat. Thus, the catalyst supported by the honeycomb structure portion (substantially, the partition walls) can be heated to the activating temperature before starting the engine or at the time of starting the engine. As a result, the exhaust gas can be sufficiently treated (typically, purified) even at the time of starting the engine.

Regarding the catalyst support, a configuration well known in the art may be adopted, and hence detailed description thereof is omitted.

EXAMPLES

Now, the present invention is specifically described by way of Examples. However, the present invention is not limited by these Examples. Evaluation items in Examples are as described below.

(1) Peeling Test

A peeling test was performed in accordance with "Testing methods for thermal cycle and thermal shock resistance of thermal barrier coatings" of JIS H 8451:2008. Specifically, for each of tubular members obtained in Examples and Comparative Examples, an operation of placing the tubular member alternately in an environment of 900° C. and an environment of 150° C. was repeated, and the number of repetitions until the insulating layer was peeled was measured. Further, when the insulating layer was peeled, a ratio of the peeled area of the insulating layer with respect to the entire area of the insulating layer was determined.

(2) Elemental Analysis on Surfaces of Tubular Main Body and Insulating Layer

After the peeling test in the section (1), the surface of a portion of the tubular main body in which the insulating layer was peeled and the surface of the peeled insulating layer on the tubular main body side were subjected to elemental analysis by energy dispersive X-ray analysis (EDX, EDS).

Examples 1 to 5 and Comparative Examples 1 to 3

The inner peripheral surface of a metal tube made of SUS430 was subjected to sandblasting treatment using #24 to #60 alumina abrasive grains. A treatment time was set to 1 minute. The surface roughness Ra of the metal tube after the sandblasting treatment was from 2.0 μm to 6.5 μm. The metal tube thus obtained was used as a tubular main body.

Meanwhile, raw materials selected from silica sand (Si source), $B_2O_3$, $Mg(OH)_2$, $Al_2O_3$, $BaCO_3$, zircon (Zr source), $La_2O_3$, petalite (Li source), $Na_2CO_3$, potassium feldspar (K source), zinc flower (Zn source), and $Cs_2CO_3$ were melted so that a glass composition to be obtained was a composition shown in Table 2 to produce a glass frit. 100 Parts by mass of water was added to 100 parts by mass of the glass frit, and the resultant was subjected to wet mixing with a ball mill processor, to thereby prepare a glass raw material dispersion (slurry). The composition and impurities of the glass were measured by inductively coupled plasma (ICP) emission spectrometry.

The glass raw material dispersion was applied by spraying onto the inner peripheral surface of the tubular main body obtained in the foregoing to form a coating film, followed by drying at 50° C. The tubular main body having the dry coating film formed thereon was fired at 860° C. to form an insulating layer (thickness: 400 μm).

The tubular member was formed as described above. The obtained tubular member was subjected to the evaluations of "(1) Peeling Test" and "(2) Elemental Analysis on Surfaces of Tubular Main Body and Insulating Layer" described above. The results are shown in Table 2. In the item "Elemental analysis" in Table 2, "present" and "absent" mean the following.

"Present": Presence of at least one of barium, zinc, and lanthanum, which were constituent components of the insulating layer, was recognized on the surface of the portion of the tubular main body in which the insulating layer was peeled, and/or presence of at least one of iron and chromium, which were constituent components of the tubular main body, was recognized on the surface of the peeled insulating layer on the tubular main body side.

"Absent": None of barium, zinc, and lanthanum, which were constituent components of the insulating layer, was present on the surface of the portion of the tubular main body in which the insulating layer was peeled, and none of iron and chromium, which were constituent components of the tubular main body, was present on the surface of the peeled insulating layer on the tubular main body side.

layer is peeled, the peeled area thereof is significantly smaller than that of each of Comparative Examples. Accordingly, it is understood that, according to Examples of the present invention, a tubular member for an exhaust gas treatment device having excellent adhesiveness between the tubular main body and the insulating layer can be achieved.

The tubular member for an exhaust gas treatment device according to at least one embodiment of the present invention may be suitably used for the application of the treatment (purification) of an exhaust gas from an automobile.

According to at least one embodiment of the present invention, in the tubular member for an exhaust gas treatment device including the insulating layer at least on the inner peripheral surface of the tubular main body, the tubular member for an exhaust gas treatment device having excellent adhesiveness between the tubular main body and the insulating layer can be achieved.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A tubular member for an exhaust gas treatment device, comprising:
   a tubular main body made of a metal; and
   an insulating layer formed at least on an inner peripheral surface of the tubular main body,
   wherein the insulating layer contains glass, and
   wherein the insulating layer satisfies at least one of the following items (1) to (3) after the following peeling test:
   (1) an element derived from the insulating layer is present on the inner peripheral surface of the tubular main body; and
   (2) an element derived from the tubular main body is present in the insulating layer; and
   (3) a peeled area when the insulating layer is peeled is 2% to 10%,
   where the peeling test involves repeating, until the insulating layer is peeled, an operation of placing the tubular member for an exhaust gas treatment device alternately in an environment of 900° C. and an environment of 150° C. in accordance with JIS H 8451: 2008.

2. The tubular member for an exhaust gas treatment device according to claim 1,

TABLE 2

| Glass composition (mol %) | Example 1 | Example 2 | Example 3 | Example 4 | Example 5 | Comparative Example 1 | Comparative Example 2 | Comparative Example 3 |
|---|---|---|---|---|---|---|---|---|
| Ba | 7 | 16 | 8 | 7 | 14 | | 3 | 3 |
| Zn | 4 | 4 | 6 | | | | | |
| La | 15 | | 3 | | | | | |
| Si | 11 | 12 | 12 | 27 | 29 | 31 | 30 | 30 |
| B | 30 | 32 | 31 | 53 | 43 | 41 | 37 | 54 |
| Mg | 26 | 28 | 31 | | | 18 | 19 | |
| Al | 7 | 8 | 8 | 13 | 14 | 10 | 11 | 13 |
| Number of repetitions | 50 | 25 | 18 | 10 | 10 | 1 | 2 | 4 |
| Peeled area | 2% | 2% | 10% | 10% | 10% | 100% | 100% | 100% |
| Elemental analysis | Present | Present | Present | Present | Present | Absent | Absent | Absent |

As is apparent from Table 2, in each of the tubular members of Examples of the present invention, the number of repetitions of heating and cooling until the insulating layer is peeled is significantly larger than that of each of Comparative Examples. Further, even when the insulating wherein the glass contains barium, and wherein the glass has a content of barium of 5 mol % or more.

3. The tubular member for an exhaust gas treatment device according to claim 2, wherein the glass further contains one of lanthanum, zinc, and a combination thereof.

4. The tubular member for an exhaust gas treatment device according to claim 3, wherein the glass has a content of lanthanum of 2 mol % or more.

5. The tubular member for an exhaust gas treatment device according to claim 3, wherein the glass has a content of zinc of 3 mol % or more.

6. The tubular member for an exhaust gas treatment device according to claim 1, wherein the insulating layer has a thickness of from 30 μm to 800 μm.

7. The tubular member for an exhaust gas treatment device according to claim 1, wherein the glass is glass containing a crystalline substance, and wherein the glass contains silicon, boron, and magnesium.

8. An exhaust gas treatment device, comprising:

an electric heating catalyst support capable of heating an exhaust gas; and the tubular member for an exhaust gas treatment device of claim 1 configured to accommodate the electric heating catalyst support.

9. A method of manufacturing the tubular member for an exhaust gas treatment device according to claim 1, the method comprising:

preparing a tubular main body; and forming an insulating layer containing glass on an inner peripheral surface of the tubular main body, wherein the glass in the insulating layer contains barium, and wherein the glass has a content of barium of 5 mol % or more.

10. The manufacturing method according to claim 9, wherein the glass further contains one of lanthanum, zinc, and a combination thereof.

11. The manufacturing method according to claim 10, wherein the glass has a content of lanthanum of 2 mol % or more.

12. The manufacturing method according to claim 10, wherein the glass has a content of zinc of 3 mol % or more.

13. A tubular member for an exhaust gas treatment device, comprising:

a tubular main body made of a metal; and an insulating layer formed at least on an inner peripheral surface of the tubular main body, wherein the insulating layer contains glass, wherein the glass contains barium, and wherein the glass has a content of barium of 5 mol % or more.

14. The tubular member for an exhaust gas treatment device according to claim 13, wherein the glass further contains one of lanthanum, zinc, and a combination thereof.

15. The tubular member for an exhaust gas treatment device according to claim 14, wherein the glass has a content of lanthanum of 2 mol % or more.

16. The tubular member for an exhaust gas treatment device according to claim 14, wherein the glass has a content of zinc of 3 mol % or more.

17. An exhaust gas treatment device, comprising:

an electric heating catalyst support capable of heating an exhaust gas; and the tubular member for an exhaust gas treatment device of claim 13 configured to accommodate the electric heating catalyst support.

\* \* \* \* \*